June 18, 1968 H. GIANNELLA 3,388,640

METHOD AND APPARATUS FOR INSERTING A LINER INTO A CARTON

Filed June 20, 1966 13 Sheets-Sheet 1

HARRIS GIANNELLA

BY

Leonard H. King

ATTORNEY.

June 18, 1968 H. GIANNELLA 3,388,640

METHOD AND APPARATUS FOR INSERTING A LINER INTO A CARTON

Filed June 20, 1966 13 Sheets-Sheet 2

INVENTOR.
HARRIS GIANNELLA

BY Leonard H. King

ATTORNEY.

INVENTOR.
HARRIS GIANNELLA
BY
Leonard H. King
ATTORNEY.

METHOD AND APPARATUS FOR INSERTING A LINER INTO A CARTON

INVENTOR.
HARRIS GIANNELLA
BY
Leonard H. King
ATTORNEY.

INVENTOR.
HARRIS GIANNELLA
BY
Leonard H. King
ATTORNEY.

METHOD AND APPARATUS FOR INSERTING A LINER INTO A CARTON

Filed June 20, 1966

INVENTOR.
HARRIS GIANNELLA
BY
Leonard H. King
ATTORNEY.

METHOD AND APPARATUS FOR INSERTING A LINER INTO A CARTON

Filed June 20, 1966 13 Sheets-Sheet 7

INVENTOR.
HARRIS GIANNELLA
BY
Leonard H. King
ATTORNEY.

INVENTOR.
HARRIS GIANNELLA
BY
Leonard H. King
ATTORNEY.

INVENTOR.
HARRIS GIANNELLA
BY
Leonard H. King
ATTORNEY.

METHOD AND APPARATUS FOR INSERTING A LINER INTO A CARTON

Filed June 20, 1966 13 Sheets-Sheet 10

INVENTOR.
HARRIS GIANNELLA
BY
Leonard H King
ATTORNEY.

INVENTOR.
HARRIS GIANNELLA
BY
Leonard H. King
ATTORNEY.

INVENTOR.
HARRIS GIANNELLA
BY
Leonard H. King
ATTORNEY.

METHOD AND APPARATUS FOR INSERTING A LINER INTO A CARTON

Filed June 20, 1966

INVENTOR.
HARRIS GIANNELLA
BY
Leonard H. King
ATTORNEY.

United States Patent Office 3,388,640

Patented June 18, 1968

3,388,640
METHOD AND APPARATUS FOR INSERTING A LINER INTO A CARTON

Harris Giannella, Leonia, N.J., assignor to Polyliner Corp., New Hyde Park, N.Y., a corporation of New York Filed June 20, 1966, Ser. No. 558,912
40 Claims. (Cl. 93—36.6)

This invention relates generally to the setup of cartons and more particularly to an improved method and apparatus for automatically securing plastic liners to the interior of the carton.

It has become increasingly desirable to provide cartons, for example, corrugated cardboard cartons, with a liquid-impervious liner. In some instances it is necessary to provide an hermetically sealable liner. Typical of the diversified range of products that may be contained in a plastic lined carton are plastic pellets used in injection moldings, spackling compounds used in the construction industry, and cookies that require constant and uniform moisture.

From the nature of the foregoing materials it is evident that some form of packaging, other than unlined cartons, is required. Because of this need, plastic liners for shipping containers were developed. It is therefore necessary to devise apparatus for automatically applying the liners to the cartons. High speed assembly apparatus is essential in order to keep pace with automatic filling machines and to keep the cost of the plastic lined cartons low and competitive.

Both the apparatus and assembly method of the present invention are directed towards the provision of improved means for adhesively securing a thin film plastic liner bag within a cardboard carton. The apparatus, to be described hereinafter in detail, is automatic, compact and reliably handles both polyethylene and cardboard materials at high operating speeds. Carton blanks and plastic bags are maintained in two spaced vertical stacks with the cartons being disposed on a vertically movable elevator and the bags disposed on a non-movable platform. Alternatively, the bags could also be positioned on a vertically movable elevator. This construction would raise the operational speed of the machine by requiring less travel time for the bag lifting assembly.

An adhesive is applied to selected portions of the top carton as the elevator delivers the stack of cartons to the glue applicator and then suitably timed transfer means delivers the glued carton to the area of the bag stack. Timed lifting means raise one transverse end of the topmost bag permitting the carton to be delivered therebelow with the glue side up. After the bag is seated on the carton blank pressure is applied. The joined bag and carton assembly is ejected for subsequent folding.

Whereas, the operation of the best example of the commercially available prior art requires five people and is capable of producing 350 assembled cartons per hour, the operating speed of the present invention is in the neighborhood of 1,000 boxes per hour and requires the attention of only two people. It has also been found that the same two men can in fact operate two machines. The resulting reduction of manufacturing costs is directly reflected in a reduced product cost to the advantage of both the producer and the ultimate consumer.

The glue pattern that is applied to the carton is variable to accommodate different sizes of cartons and may be quickly adjusted without excessive "down time" of the machine. The plastic bag is accurately deposited on the carton blank within ±¼ inch of the desired location and this operation may also be varied at minimum expense when the machine is changed over from one carton size to another.

At least one version of this apparatus can assemble plastic bags to cartons having a minimum size of 34 inches long by 15 inches wide and a maximum of 72 inches long and 36 inches wide. It is contemplated that other versions of this apparatus will be able to handle cartons ranging from a minimum of 72 inches long by 36 inches wide to a maximum of 108 inches long by 50 inches wide. It is to be understood, however, that the basic concept is not limited to any particular dimensional relationship.

Accordingly, it is an object of this invention to provide improved, compact apparatus for securing plastic liners to cardboard cartons.

Another object of this invention is to provide a novel method for securing plastic liners to cardboard cartons.

An additional object is to provide apparatus of the aforementioned type that is fully automatic and reliable at high speeds.

A further object is to provide apparatus of the aforementioned type that utilizes, adjacent, vertically arranged supply stacks of liners and cartons.

A particular object is to provide apparatus for assembling liners to cartons wherein the liners are individually lifted in a vertical plane prior to assembly and wherein the cartons move in a horizontal plane for assembly with the liner.

Still another object is to provide improved means for individually lifting liners in a carton liner applying machine.

Yet another object is to provide improved means for individually transferring cartons in a carton liner applying machine.

These and other objects, features and advantages of the invention will, in part, be pointed out with particularity and will, in part, become obvious from the following more detailed description of the invention, taken in conjunction with the accompanying drawing, which forms an integral part thereof.

In the various figures of the drawing like reference characters designate like parts.

Figure 23:
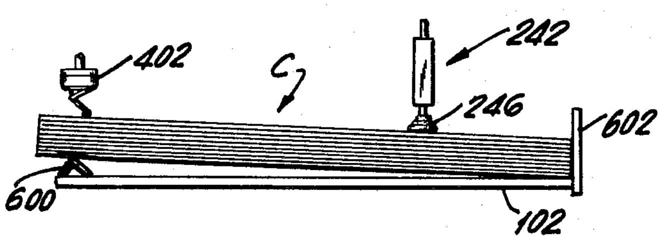
Figures 13, 14, 18:
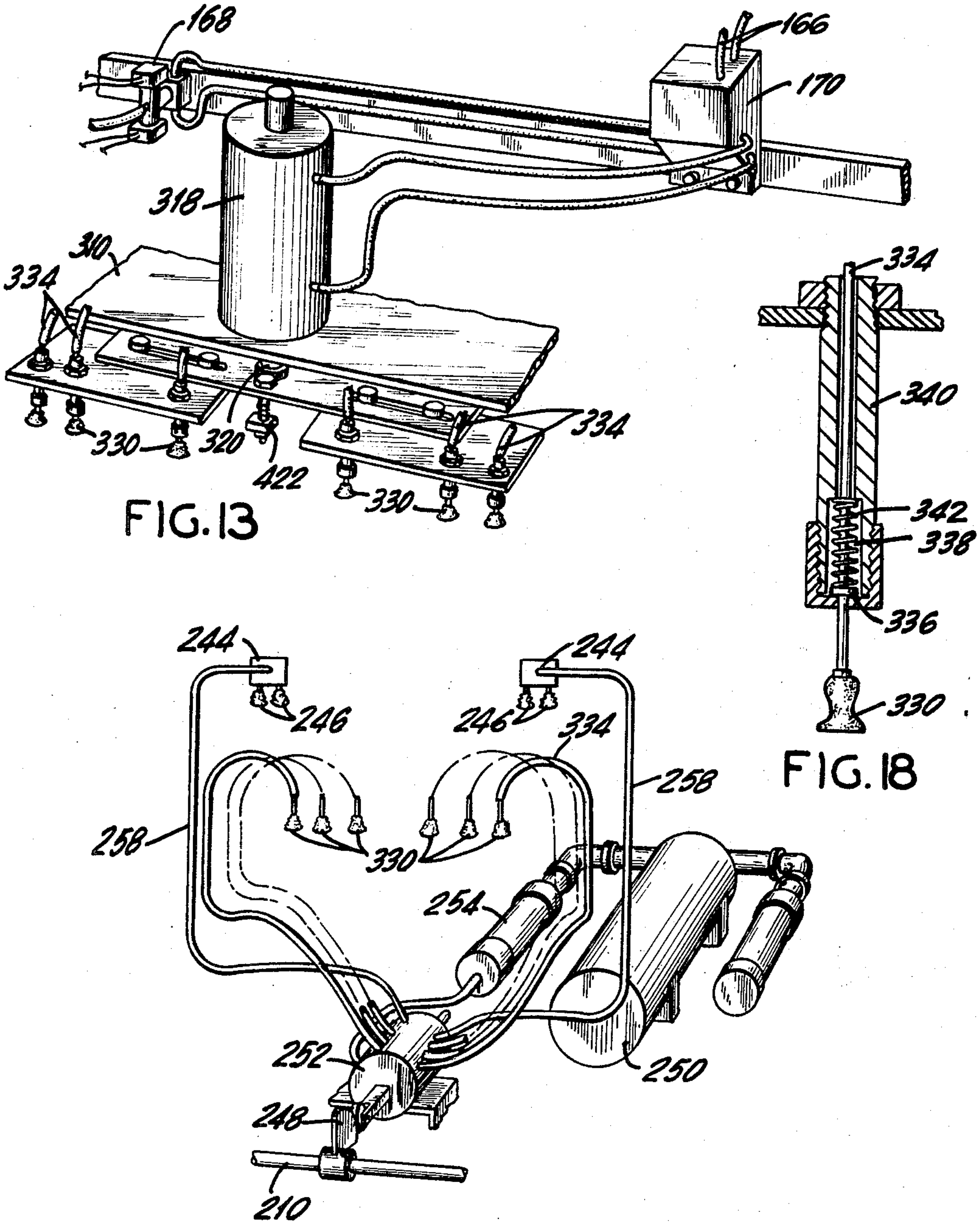
Figure 15:
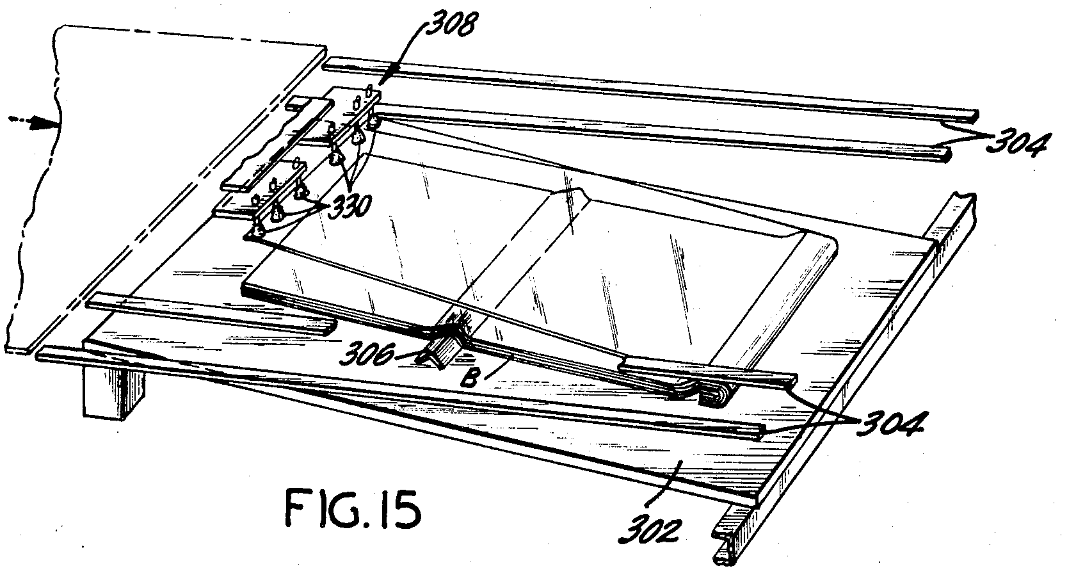
Figure 16:
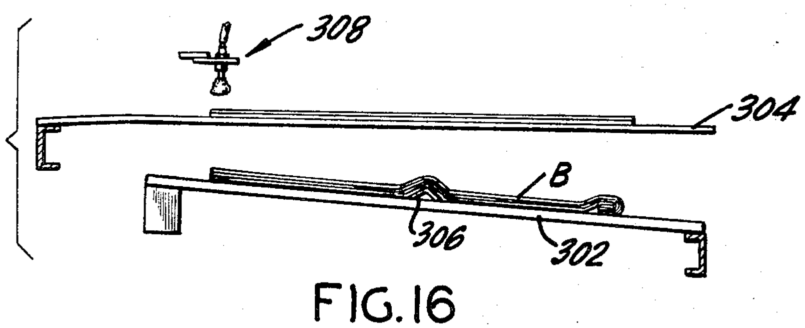
Figure 17:
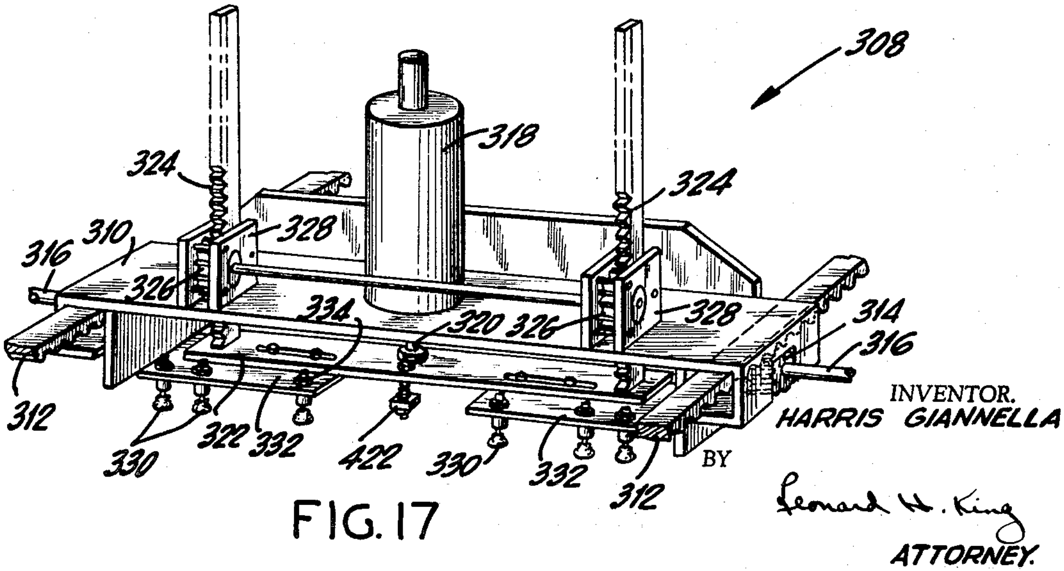
Figure 19:
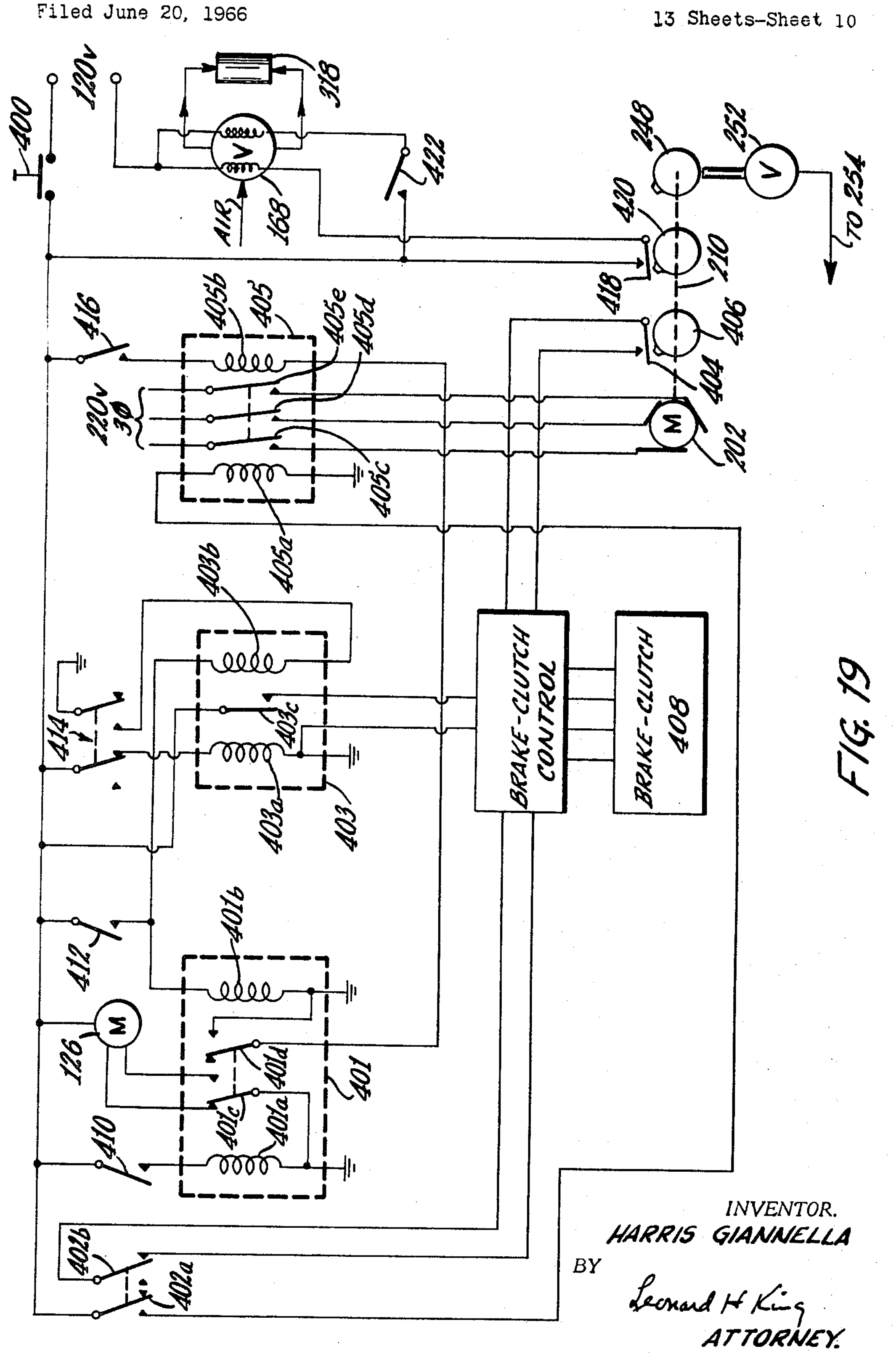
Figure 21:
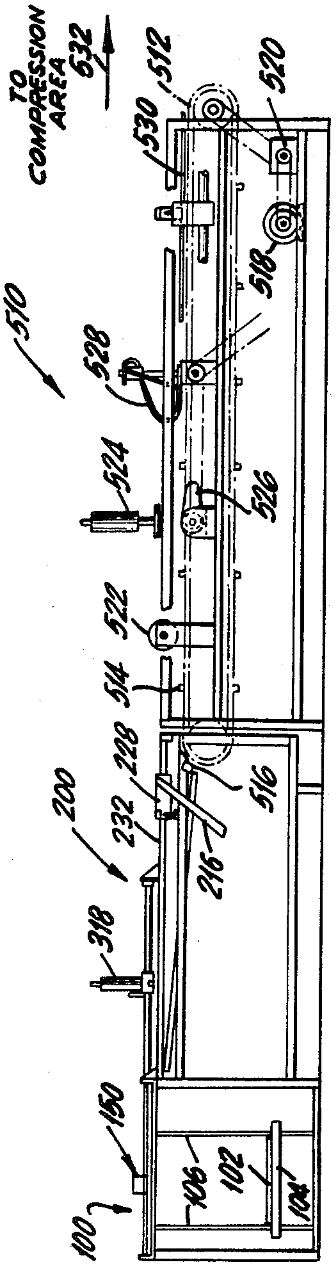
Figure 22:
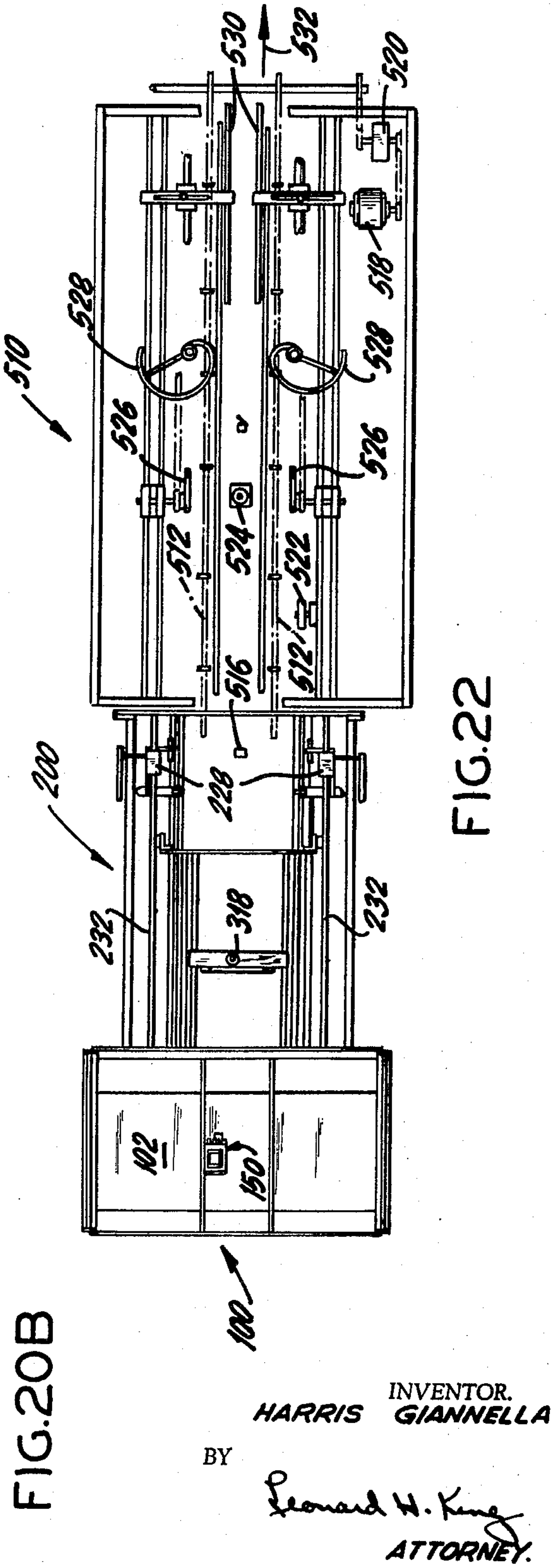
Figure 20A:
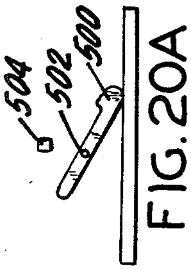
Figure 20B:
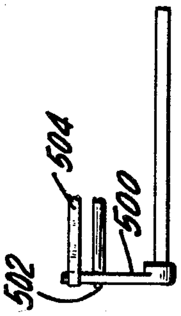
Figure 24:
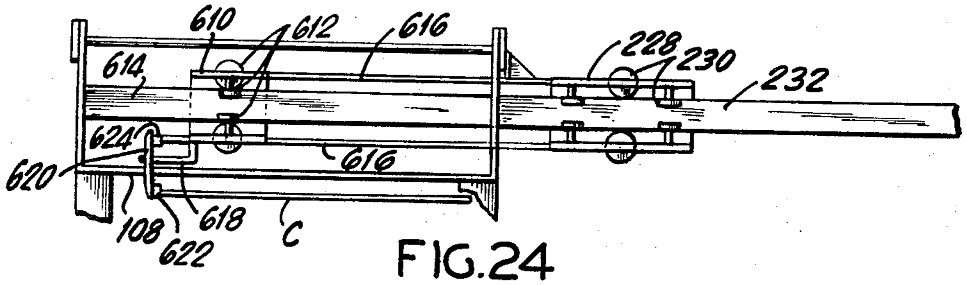
Figure 25:
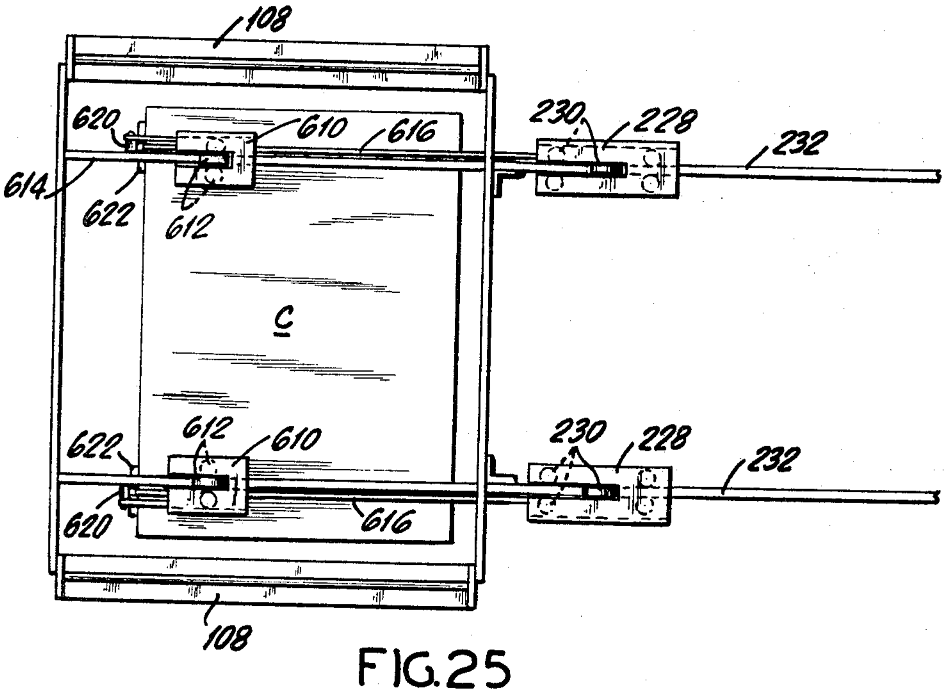
Figure 26:
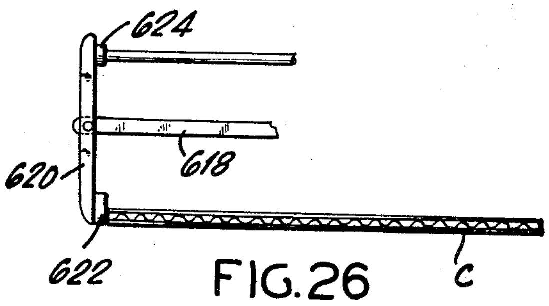
Figure 27:
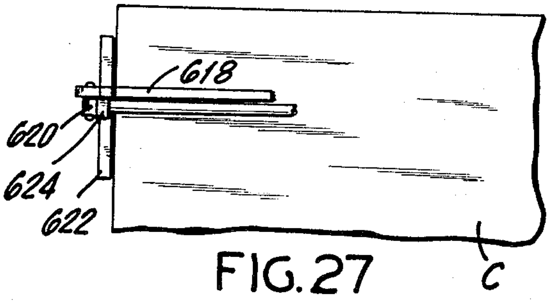
Figure 28:
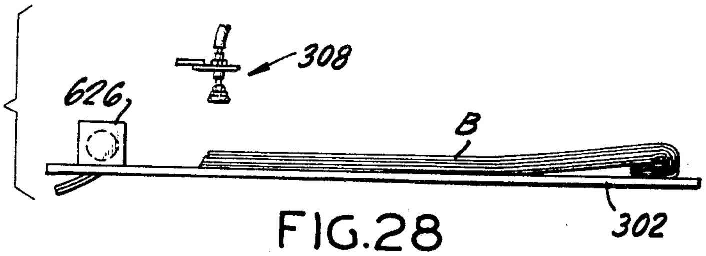
Figure 29:
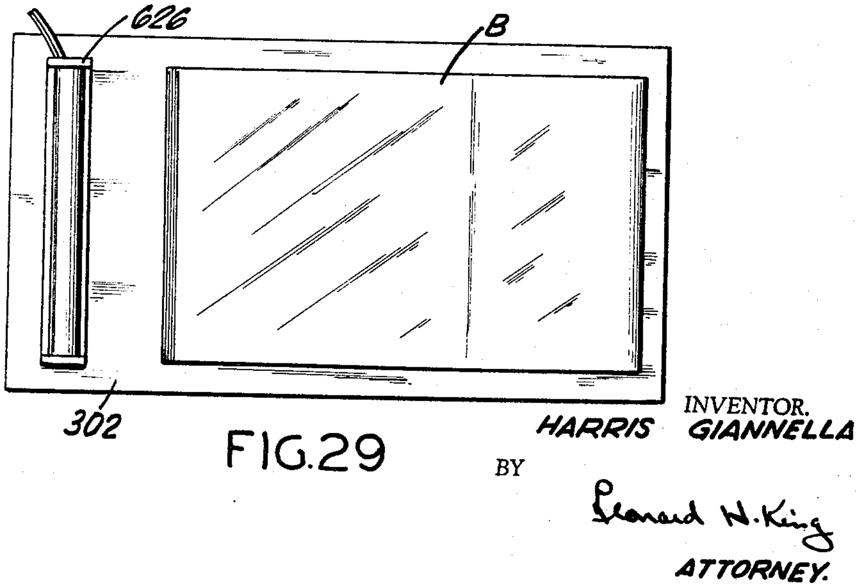

FIG. 13 schematically shows the compressed air system;

FIG. 14 schematically shows the vacuum system;

FIG. 15 is a side elevational view illustrating the relationship of the stack of bags to the bag pickup mechanism;

FIG. 16 is another side elevational view showing a carton in place relative to a lifted bag;

FIG. 17 is a fragmentary perspective view illustrating the bag pickup mechanism;

FIG. 18 is an enlarged fragmentary view of the vacuum cup assembly used for carton pickup;

FIG. 19 is a diagrammatic view of the electrical control circuit used with the present invention;

FIG. 20A and FIG. 20B are side elevational views schematically illustrating means to eject an assembled carton;

FIG. 21 is a schematic side elevational view illustrating carton folding mechanism used with the bag and carton assembly apparatus;

FIG. 22 is a schematic plan view of the mechanism shown in FIG. 20;

FIG. 23 is a fragmentary side elevational view of an alternative embodiment of the carton pickup assembly;

FIG. 24 is a fragmentary side elevational view of an alternative embodiment of the carton transfer mechanism;

FIG. 25 is a fragmentary plan view of the carton transfer mechanism shown in FIG. 24;

FIG. 26 is an enlarged, fragmentary side elevational view in section of one end of the carton mechanism shown in FIG. 24;

FIG. 27 is an enlarged fragmentary plan view of the apparatus shown in FIG. 26;

FIG. 28 is a fragmentary side elevational view of alternative apparatus used at the bag supply station; and FIG. 29 is a plan view of the apparatus shown in FIG. 28.

*Carton elevator assembly*

Figure 1:
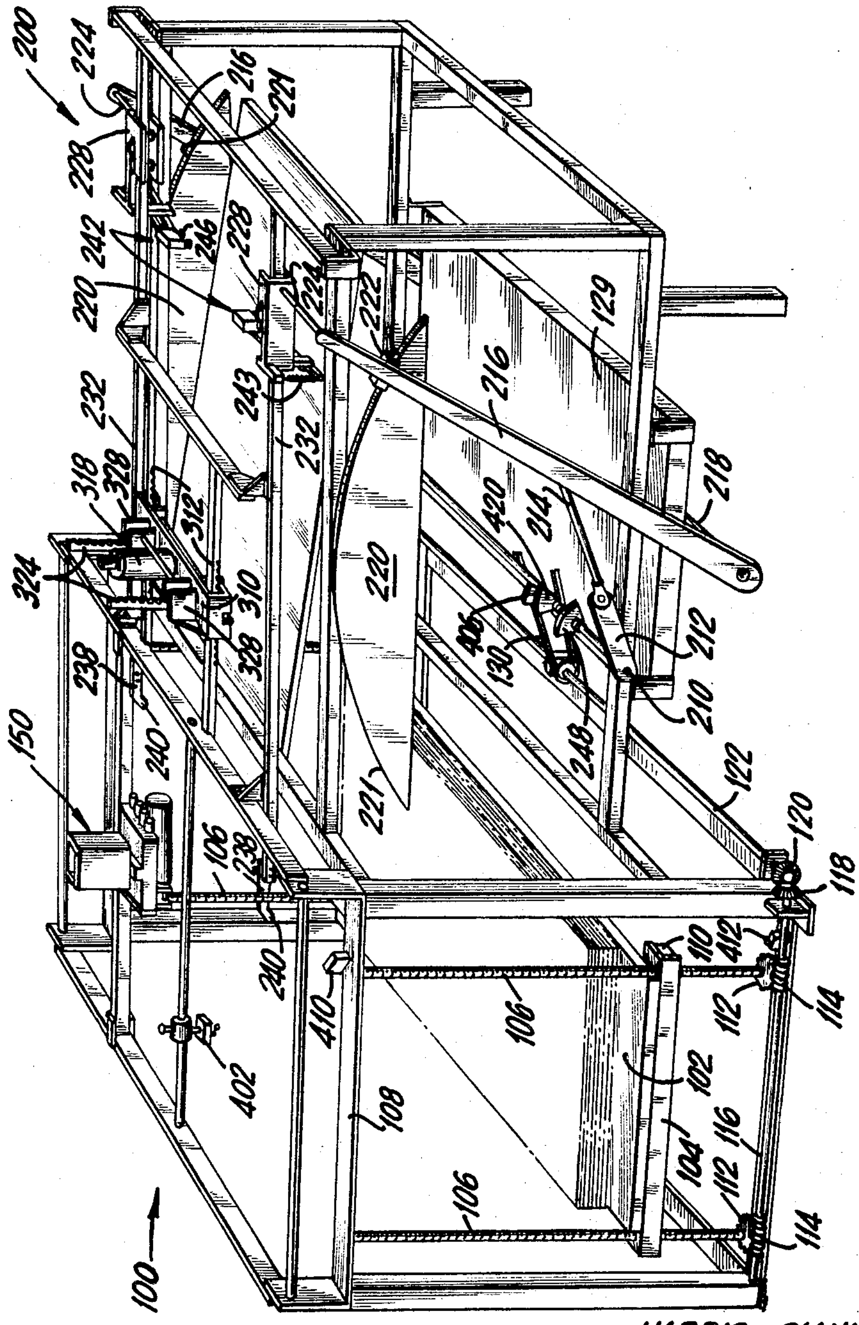
FIG. 1 is a side elevational view of the apparatus comprising this invention.
Figure 2:
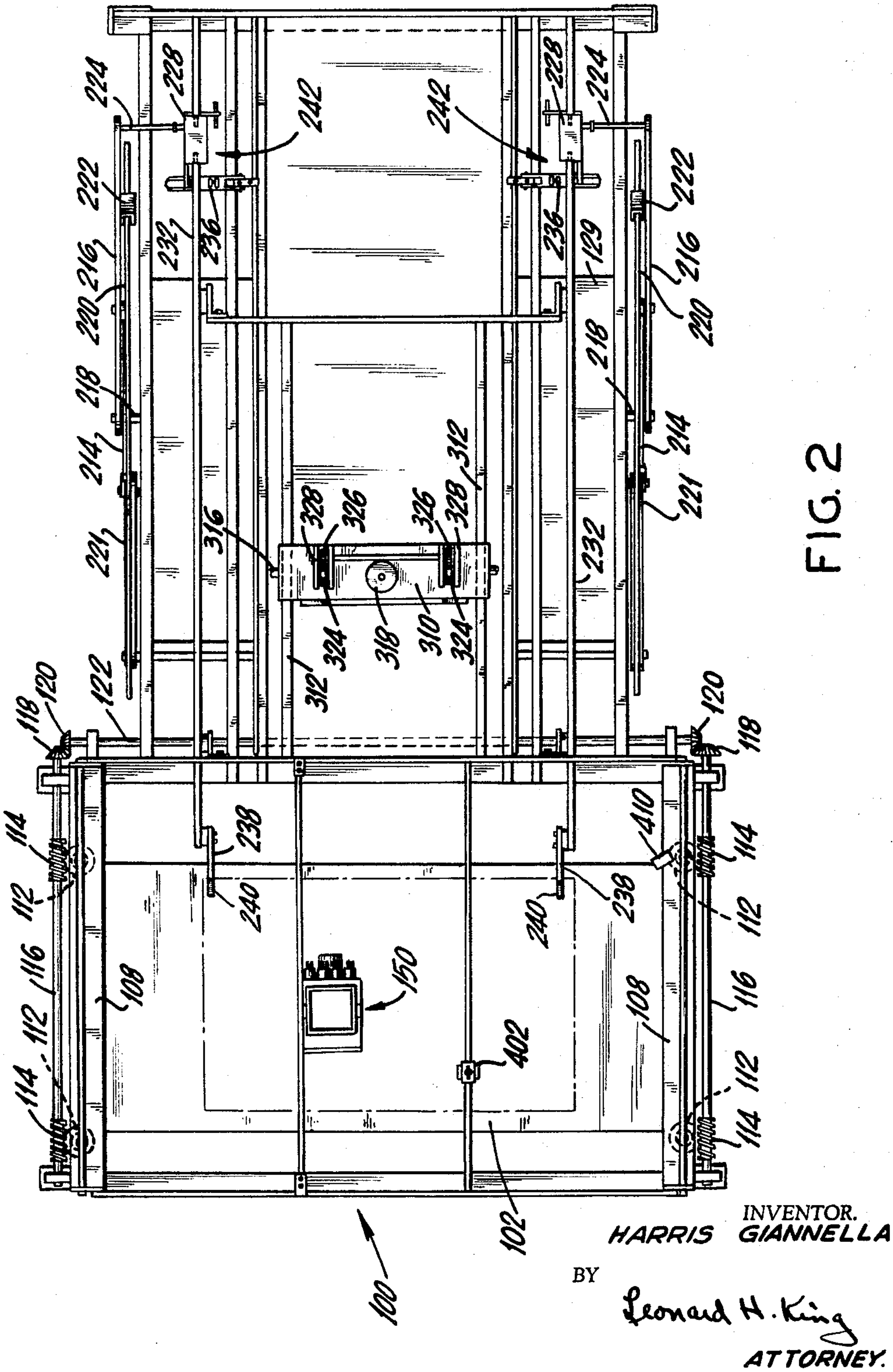
FIG. 2 is a plan view of the apparatus shown in FIG. 1.
Figure 3:
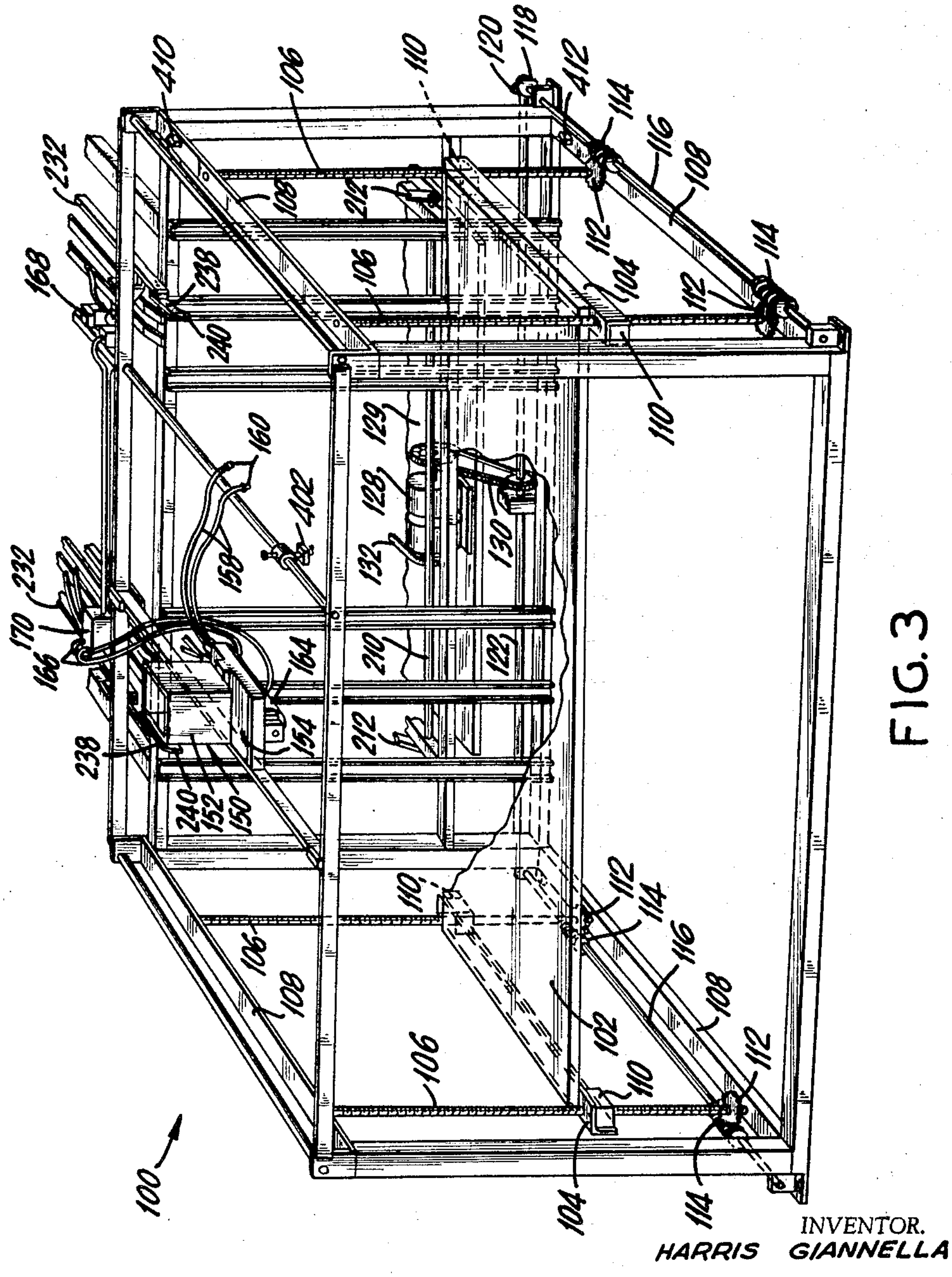
FIG. 3 is a fragmentary perspective view of the elevator mechanism used with the present invention.

Referring now to FIGS. 1, 2 and 3 of the drawing, it will be seen that the illustrated embodiment of this invention includes a carton elevator assembly 100 comprised of a horizontal platform 102 carried in a vertical plane by side support members 104. Two pairs of spacedly opposed threaded rods 106 are rotatably journalled in frame 108 in order to guide the support members 104 and the platform 102 during vertical travel. As may be seen in the drawing, one end of frame 108 is completely open to facilitate the loading of a stack of carton blanks onto the horizontal platform.

Rods 106 are threaded throughout their entire length and are engaged by travelling nuts 110 integral with support members 104. The lower end of each rod includes right angle drive means comprised of a worm wheel 112 meshingly engaged with and driven by a worm 114. Parallel, horizontal shafts 116, each journalled in suitable bearings, carry worms 114 as well as a right angle gear 118 at one end thereof. Right angle gears 120, secured proximate the ends of transverse drive shaft 122, mesh with gears 118 to complete the gear train whereby the elevator may be moved up and down. Suitably positioned switches, to be described hereinafter in conjunction with the circuit diagram, are used to limit both the upward and downward travel of the elevator.

*Drive assembly*

Figure 4:
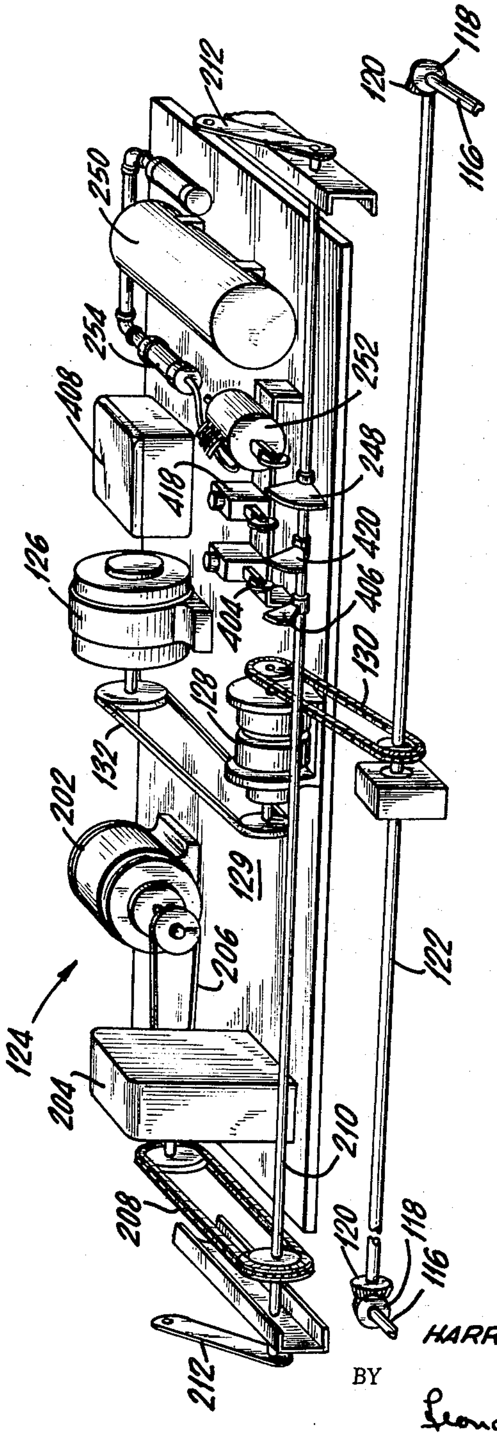
FIG. 4 is a fragmentary, perspective view of the drive assembly.

The transverse shaft 122 of the elevator assembly is driven by an assembly 124 comprising a 1 horsepower motor 126 through a brake and clutch assembly 128 mounted on a fixed platform 129. Power transmission is provided by conventional means such as pulleys and belts or chains and sprockets. Two such arrangements designated 130 and 132 are shown in FIG. 4. A reversing relay is electrically connected to the motor and will be functionally described in conjunction with the schematic diagram of FIG. 19. The drive assembly 124 includes several other components whose function will be described in connection with other aspects of this machine.

*Glue applicator*

Figure 6:
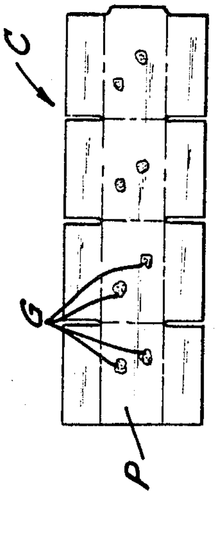
FIG. 6 is a plan view of a developed carton blank having spots of glue applied thereto.
Figure 5:
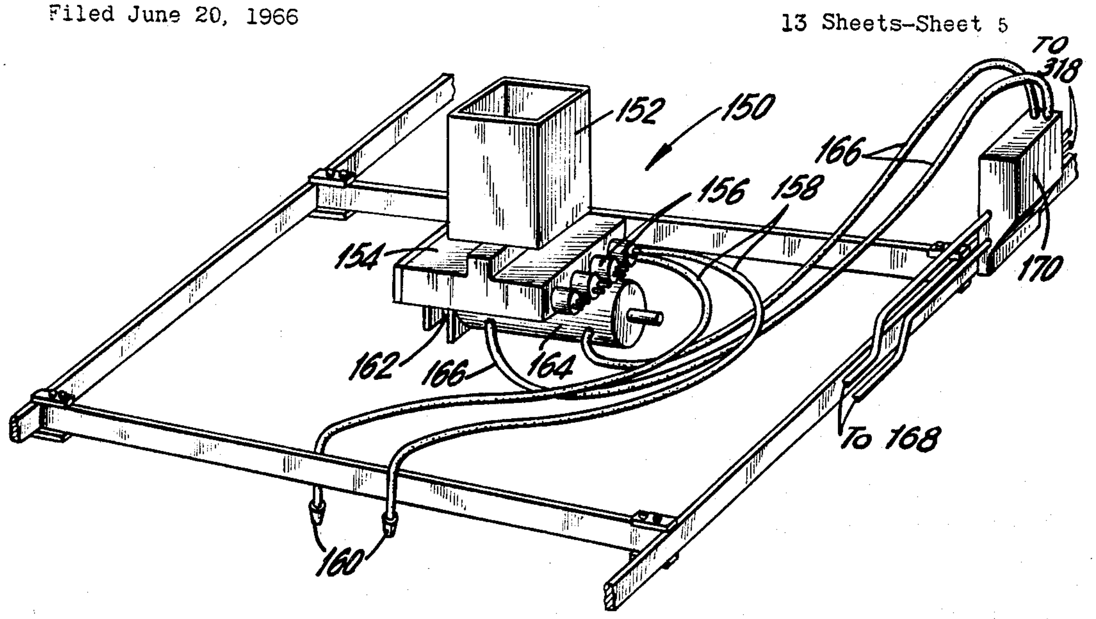
FIG. 5 is a fragmentary perspective view of the glue applicator assembly.

Glue applicator assembly 150, as seen in FIG. 5, is mounted on a transverse support bar secured to frame 108 and is positioned over the vertical stack of cartons carried by the elevator assembly. The glue assembly mechanism is comprised of a tank or reservoir 152 that is in communication with a hollow dispensing body 154. Glue outlets 156 are provided at one end of body 154, each glue outlet having two dispensing tubes 158 connected thereto. A nozzle or fitting 160 including a device such as an electrically operated solenoid is furnished at the end of each tube and is positioned such that it may apply a dab of glue G to the main panels P of the carton C in the pattern, shown in FIG. 6. The particular pattern illustrated is by way of example only, it being understood that the pattern may be altered as needed by the repositioning, removal or addition of nozzles. Alternatively, a single, commercially available pressure tank may be used for the glue. The desired number of outlets and electrically operated solenoid valves would also be provided.

Glue is forced out of body 154 by a sliding piston contained therein. Piston 162 of air cylinder 164 is connected to an external extension of the sliding member. When compressed air is supplied to the air cylinder by conduit 166, the piston of the cylinder is displaced. The glue will be brought into body 154 on the forward stroke of the air cylinder and glue will be dispensed through the conduits and fittings on the return stroke of the air cylinder. A four-way electrical solenoid valve 168 (FIG. 13) to be described in greater detail is connected with the circuit diagram of FIG. 19 controls the action of the air cylinder. The activation of the solenoid is timed to coincide with the beginning of the downward stroke of the bag pickup mechanism, as will be described later. Compressed air is fed to the air cylinder through an air manifold 170 (FIG. 5) that is positioned intermediate the solenoid and the cylinder. The air manifold is also utilized for the actuation of the bag pickup assembly as schematically shown in the compressed air system of FIG. 13.

Figure 9:
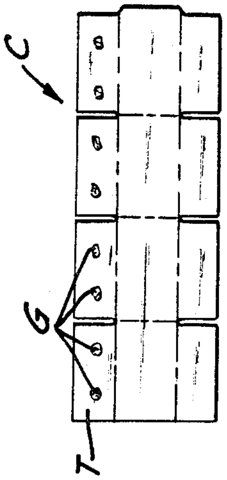
FIG. 9 is a plan view of a developed carton blank showing the application of additional glue spots affording the use of an additional feautre.
Figure 7A:
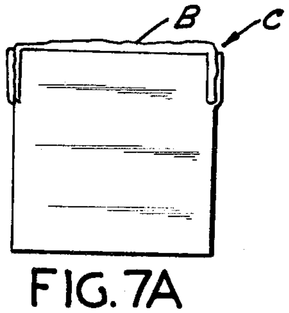
FIGS. 7A and 7B are side and plan views, respectively, of a carton and bag assembled by the apparatus and method of this invention.
Figure 7B:
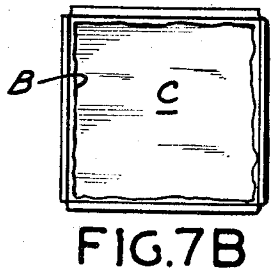
Figure 8A:
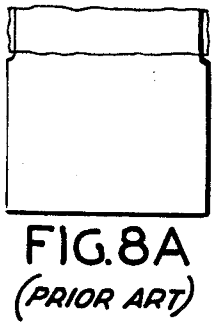
FIG. 8A (PRIOR ART)
FIGS. 8A and 8B are side and plan views, respectively.
Figure 8B:
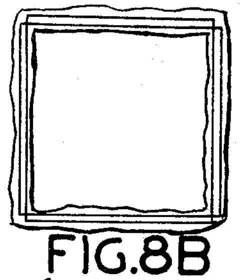
FIG. 8B (PRIOR ART)

Still another feature that is within the scope of this invention is the use of an auxiliary glue mechanism to apply spots of adhesive G to the top flaps T of the carton C blank, as shown in FIG. 9. This would provide tear away glue spots for the plastic bags B that are inserted and would permit the bag to open when the box is opened for filling as shown in FIGS. 7A and 7B, which are side and plan views, respectively. Thus, since the bag extends at least to the top of the opened carton and preferably above, there is no danger of the contents accidentally falling between the bag and the carton. It is therefore not necessary to fold down the lip of the bag B' over the top flaps T' of the carton C', as was required with some of the prior art devices. FIGS. 8A and 8B, which are also side and plan views, respectively, illustrate the prior art construction.

*Carton pickup and transfer mechanism*

Figures 10, 11, 12:
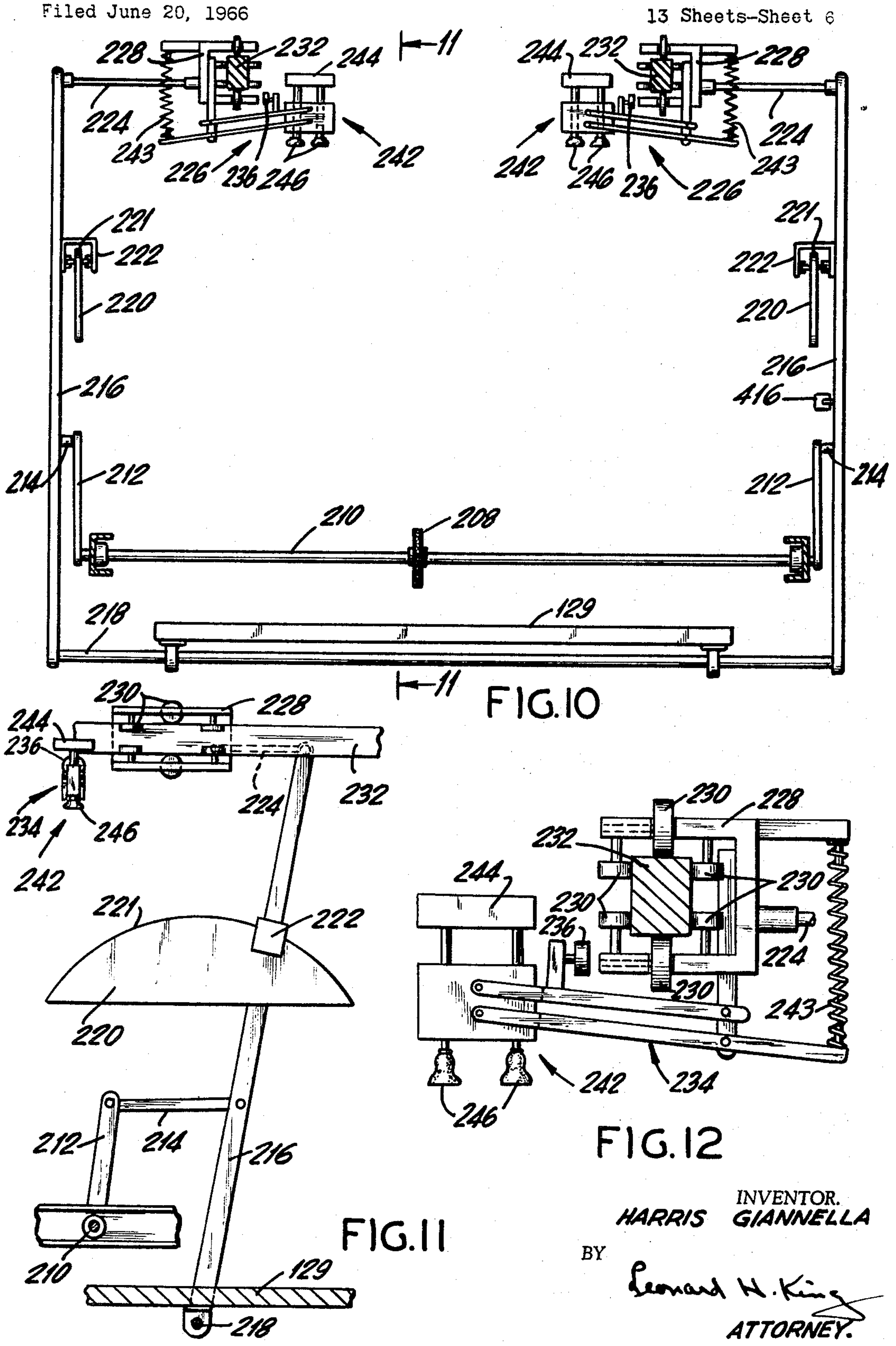
FIG. 10 is a fragmentary and elevational view of the carton transfer mechanism.
FIG. 11 is a fragmentary side elevational view taken along line 11—11 of FIG. 10.
FIG. 12 is an enlarged view of a portion of the mechanism shown in FIG. 10.
Figures 12A, 12B:
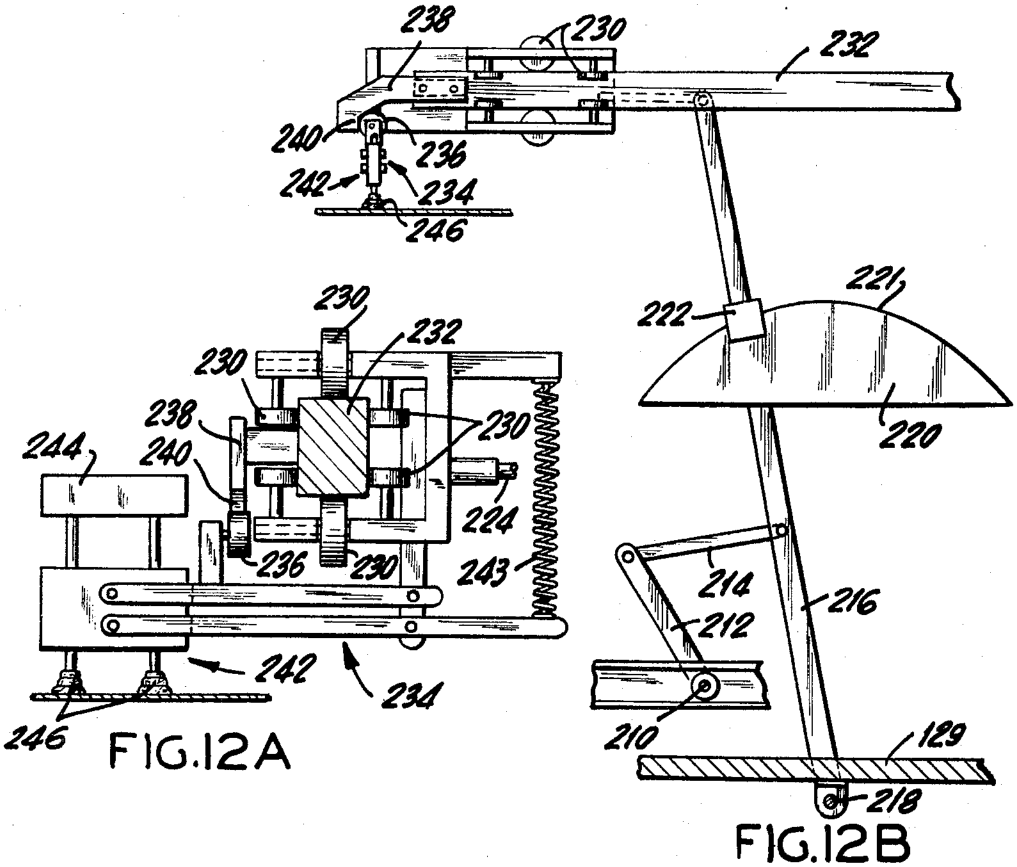
FIG. 12A is a sectional view similar to FIG. 12, showing the suction cups in a depressed position.
FIG. 12B is a side elevational view of the carton pickup assembly in contact with the top carton.

In one embodiment of the invention, the top carton on the elevator is picked off by suction means after it has been glued and is laterally carried to the assembly area 200. The mechanism providing this action is illustrated in FIGS. 10, 11 and 12. Motor 202 is mounted on platform 129 of the drive assembly 124 (FIG. 4), and, in combination with a gear box 204 and suitable power transmission means 206 and 208, drives a transverse timing shaft 210. A crank arm 212 is rigidly secured at each outboard end of the timing shaft 210 and connecting arms 214 are pivotally secured to the upper end of each crank arm. The connecting arms also pivotally support a pair of reciprocating arms 216. A transverse shaft 218 supporting the lower end of arms 216 and suitable bearings permit free movement of the reciprocating arms in response to actuation of motor 202. Fixed guide members 220 are flat plates having an arcuate top edge 221 which is arranged to be received within a U-shaped member 222 secured to each reciprocating arm whereby the arcuate travel of the reciprocating arms is carefully and closely controlled.

The upper end of each reciprocating arm is provided with an inwardly projecting connecting rod 224 that supports a carton takeoff assembly 226. Both reciprocating arms and both takeoff assemblies move in unison to transport one glued carton from the top of the stack on the elevator assembly 100 to the bag assembly area 200. Since both takeoff assemblies are substantially identical, only one has been described.

The inner end of each connecting rod 224 is secured to housing member 228 that includes a plurality of rollers 230 journalled in the walls thereof. As shown particularly in FIG. 12 the rollers ride on fixed guide rails 232 that extend along the length of the machine. Because the rollers engage all four sides of each rail the carton takeoff assembly is very accurately translated from one station to the other. In addition, one wall of housing member 228 is utilized to pivotally support parallel linkage 234. A cam roller 236 is mounted on the parallel linkages and engages the underside of cam track 238 having a downwardly sloping cam surface 240 at the end thereof. When the reciprocating arm reaches the end of its stroke the carton takeoff assembly will be positioned over the carton elevator. The downward deflection of rollers 236 by the cam surface of track 238 causes a vacuum head assembly 242 to be downwardly deflected. Spring member 243 biases the suction cups and the parallel links with respect to the housing member 228. The vacuum head assembly is carried by the inner ends of the parallel links and comprises a manifold 244 and a number of vacuum cups 246 fed by the manifold.

A cam 248 secured to the timing shaft 210 actuates the vacuum inducing means in timed relation to the movement of the reciprocating arms. Referring now to FIGS. 4 and 14, it will be seen that a vacuum pump 250 is connected to a vacuum valve 252 having a displaceable piston 254. Cam 248 is secured to timing shaft 210 for rotation therewith and is arranged to intermittently engage the valve piston. Conduits 258 extend between valve 252 and manifold 244 so that when the reciprocating arms are at one end of their arcuate stroke and are positioned over the cartons on the elevator, the vacuum cups 246 may pick up the topmost, glued carton. Vacuum is maintained while the carton is transferred to the bag assembly station.

*Bag supply and pickup assembly*

A supply of bags are maintained in the bag assembly area on a platform 302 that is secured in one embodiment of the invention to the machine frame in an inclined plane. The bag platform is positioned directly below a number of spaced horizontal rail members 304 arranged to receive the glued carton from the carton transfer mechanism described above. The platform also includes a transversely positioned rib 306 in the form of an angle iron. When the bags are placed on the platform and the rib, a ripple will be formed in the stack of bags. The ripple caused by the rib assures sufficient slack in the stack of bags so that when the top bag is raised above the incoming glued carton, the bags therebelow will not be disturbed. As shown in FIG. 16, the back end of the bag pile is tucked under approximately 1 inch. This serves to anchor the bags whereby the lower bags will not move and cause misalignment of the pile when the top bag is picked up. It should be noted that the open end of the bag is tucked under and lifting occurs at the closed end of the bag.

Bag pickup assembly 308 is comprised of a transverse platform 310 that is horizontally movable with respect to the machine frame. A pair of spaced rack members 312 extend along both sides of the machine and are engaged by gears 314 rotatably journaled at the outboard ends of platform 310. Shaft 316, on which the gears are mounted, serves as means for horizontally positioning the platform parallel to the feeding axis of the carton blanks in accordance with the size of the carton blank being run. This adjustment is necessary because the arcuate travel of the rocker arm is set and the leading edge of the carton is always deposited in the same place.

The bag pickup assembly also includes means for providing limited vertical motion. An air cylinder 318 is secured to platform 310 with its piston 320 extending therethrough. A subplatform 322 is mounted on the cylinder piston and includes a pair of spaced rack members 324 extending upwardly through platform 310. Gears 326 mounted in bearing blocks 328 on platform 310 engage the rack members whereby axial movement of the cylinder piston vertically displaces the subplatform accordingly. The piston of the cylinder is movable over a distance of approximately 12 inches.

A number of suction cups 330 are mounted in plates 332 that are transversely adjustable with respect to subplatform 322. As shown in FIG. 18, the air line 334 includes a shoulder portion 336 mounted within a bore 338 of housing 340. A compression spring 342 is disposed about the air line within the bore so that the suction cup is resiliently biased with respect to the bag pickup assembly. The air lines 334 are connected to the vacuum valve 252 whereby the application of suction is timed by the interaction of cam 248 and the piston of the vacuum valve.

The movement of the bag pickup assembly is timed to coincide with the delivery of the glued carton to the carton rails. Continued inward movement of the carton along the rails and past the leading edge of the bag will separate the top bag from the pile. Alternatively, the bag is secured to the glued carton by means of a puff of air directed against the bag. Tamping means could also be employed to firmly seat the bag on the carton.

*Sequence of operation*

The sequence of operation of the apparatus may best be understood by reference to the foregoing description taken in conjunction with the schematic diagram of the electrical control system shown in FIG. 19. A supply of carton blanks is loaded in a vertical stack onto the elevator which is in a down position. In the drawing relays 401, 403 and 405 are of the latching type. Coils 401*b*, 403*b*, 405*b* serve as latching coils when energized, while coils 401*a*, 403*a*, 405*a*, when energized, release the respective latches. A starter button 400 is pushed, causing motor 126 to drive the elevator until the topmost blank makes contact with snap action switch 402. This is a double switch with one side (402*a*) normally open and one side (402*b*) normally closed; the physical location of the switch may be seen in FIG. 3. When switch 402*a* is closed, relay coil 405*a* is energized, unlatching the relay and closing the contacts energized. This starts the carton transfer apparatus.

The vacuum cups pick up the topmost carton and deliver it to the bag assembly station. A snap action switch 404 positioned on platform 129 is engaged by a cam 406 rotatably secured to shaft 210. The closing of this switch activates the elevator brake-clutch combination 408. The movement of the elevator is controlled by the brake and clutch combination. When the switch 404 is closed, the elevator will rise to the thickness of one carton blank. Switch 402 acts as an override control and stops the elevator, permitting the elevator to rise only one carton thickness at a time. The stepwise movement of the elevator continues until switch 410 is engaged. The closing of switch 410 unlatches contacts 401*c* of relay 401 and reverses the elevator motor 126 and makes the platform move down until contact is made with another switch 412. Closing of switch 412 energizes latching solenoid 401*b*, reversing the elevator drive motor 126 to drive upwardly. At the same time latching coil 403*b* is energized brack-clutch 408 is energized through contacts 403*c* controlled by relay 403. Switches 410 and 412 may be seen in FIG. 3. After the platform is loaded again, reset button 414 is depressed and the cycle repeats. Reset button 414 is also a double switch. When relay coil 403*a* energizes through switch 414, the circuit to coil 403*b* is opened.

The energizing of switch 410 also causes the energizing of a switch 416 (FIG. 10). When switch 416 is closed by action of the rocker arm, relay latching coil 405*b* is energized, latching open the power contacts 405*c*, 405*d*, 405*e* leading to crank motor 202. This stops rotation of shaft 210. Contacts 401*d* are open when the elevator is in an up mode, thereby preventing the relay coil 405*b* from becoming energized and disabling motor 202. The rocker arm stops at the end of its stroke in a position away from the carton feed. The movement of the bag pickup assembly is accurately initiated by a switch 418 that is opened and closed by cam 420. Transverse shaft 210 supports the cam 420 in an angular position that assures its proper time relationship with the remainder of the apparatus. The bag pickup cylinder travels downwardly until switch 422 (FIG. 17) comes in contact with the topmost bag disposed on the inclined platform. When contact with the bag is made, the vacuum cups pick up the leading edge of the bag on a return stroke of the cylinder. The glued carton blank may then be fed underneath the bag. It should be noted that switches 418 and 422 activate the four-way electric solenoid air valve to control the drive and return movement of the piston of cylinder.

*Carton ejection and folding system*

After the carton has been assembled, the carton pickup assembly returns to the elevator to transport the next glued carton. As shown in FIGS. 20A and 20B, the carton ejection means is carried by housing 228. A lever 500 is loosely and pivotally mounted on a standoff 502 that is integral with housing 228. A stop member 504 is also secured to the housing. When the carton pickup head is moving towards the elevator assembly, that is towards the left in FIG. 11, lever 500 will slide on the top of the carton that has previously been assembled. On its reaward stroke while it is bringing a new carton into the bag assembly station, the lever will be in abutment with the carton that had previously been assembled. Continued movement of the carton pickup head will cause the lever to push the assembled carton towards the right.

The ejected carton is fed to the folding apparatus 510 which comprises a pair of elongated chains 512 having a number of lugs 514 spaced therealong at equal intervals. As the box leaves the bag assembly area, it strikes a snap action switch 516 which is arranged to activate a motor 518 in order to drive the chain one station length. Clutch means 520 are also included as part of the power transmission system between the motor and the chain. At the first station glue rollers 522 apply an adhesive to the carton flaps. At the second station an air cylinder 524 clamps the box downwardly while rotating arms 526, positioned on either side of the longitudinal line of travel of a carton, breaks the folds or flaps of the carton and starts to fold. At the next station a pair of outboard final folders 528 catch the flaps that have been prebroken and complete the remainding 90 percent of the fold. Finally, at the last station folddown bars 530 convey the carton to compression unit 532.

*Alternative embodiments*

The following description will be directed to several alternative embodiments for mechanisms previously described. The first such embodiment is shown in FIG. 23 and is particularly applicable in those situations wherein the cartons to be worked on are relatively thin and subject, during their transport, to buckling or creasing at places other than the fold lines. The carton elevator is provided with a transverse rib 600 which may be as simple as a ½ inch x ½ inch angle iron. The cartons are placed with one end resting on the angle iron, the other end abutting back frame 602 of the elevator. This embodiment is used with the vacuum pickup previously described. The slight incline of the cartons has been found to eliminate the undesirable bending of the thin-walled cartons when they are picked up by the suction cups.

As an alternative to the vacuum pickup of the cartons described previously, there is provided, as shown in FIGS. 24 to 27, means for pushing the cartons from the elevator to the bag assembly station. In addition to the two carton takeoff housings 228 riding on rails 232, there is provided a second pair of carton takeoff housings 610. The second pair of carton takeoff housings is provided with a plurality of rollers 612 arranged to ride on the four sides of each carton rail extension 614. The first and second pairs of carton takeoff housings are tandemly connected to each other by rods 616. Arms 618 extend outwardly from each housing 610, in the direction of the carton elevator, and include a link 620 pivotally mounted on the ends thereof. The links normally hang downwardly under the influence of gravity and in the forward movement of the carton pickup assembly, that is, towards the carton elevator, the links slide over the surface of the top carton. Each link is also provided with a pusher plate 622, so that when the entire carton surface is traversed, the plate will fall behind the farthermost edge of the carton. Stop members 624, also mounted on the housings 610, extend in the same general direction as arms 618 and are arranged to prevent further pivotal movement of the links 620 when the carton takeoff housings are being moved away from the carton elevator area and towards the bag assembly area. FIG. 26 particularly illustrates the action of the stop member at the moment when the removal of a carton from the elevator is started.

FIGS. 28 and 29 illustrate alternative means for assuring that only one bag is lifted at a time when the glued carton is being delivered. A commercially available 110 v. input static eliminator 626 is placed on the bag platform proximate one transverse end of the bag stack. For purposes of orientation, the static eliminator is positioned opposite to the end of the bags that is tucked under. The use of a static eliminator eliminates the need for inclining the bags as shown in FIGS. 15 and 16. With the static eliminator it is also unnecessary to use an angle iron to put a ripple in the bags.

Although not specifically illustrated, it is contemplated that the scope of this invention includes the use of an elevator for the bag platform. In FIG. 17 the bag pickup assembly is shown having a relatively long stroke as defined by the rack and gear components. Instead of having the bag stack disposed on a non-movable platform that requires ever increasing bag cylinder strokes, it is also practical to provide an elevator for the bags, that is, the bag stack will be incrementally moved upward by the elevator as the bags are assembled to the cartons and removed. The provision of a bag elevator will considerably shorten the stroke required by the bag pickup cylinder and thus increase the speed of the machine over the figures given previously.

It is also contemplated, although not specifically illustrated, that gusseted bags may be assembled to the cartons. The advantage of using a gusseted bag is that they need be glued to only one panel of the carton. Because of this method of gluing, the bags open automatically. The bottom of the bags will be square with the carton when the carton is opened.

The apparatus hereinbefore described and shown in the drawing provides means for adhesively securing plastic liners to unfolded cartons. The apparatus is rugged, efficient and automatically secures the liners at a high rate of speed. Labor costs are held down because a minimum of personnel is required to supervise the operation of the machine. The apparatus is compact and may be used in conjunction with conventional carton folding and erecting apparatus.

Means are provided for elevating a stack of cartons in a step wise manner. After an adhesive is selectively applied to the topmost carton, transfer means deliver the glued carton to a liner supply platform that includes novel liner lifting means. In timed relation to the movement of the carton transfer means, the lifting means raises the top liner whereby it may be applied to the glued carton that had previously been delivered. Subsequent to the assembly the carton and liner are ejected and folded to assume an erect configuration.

What is claimed is:

1. Apparatus for securing a plastic liner to the inside surface of a carton, said apparatus comprising:

(a) a frame member;

(b) carton elevator means vertically movable in two opposite directions with respect to said frame member, said elevator means being arranged to carry a supply of unfolded cartons in a vertical stack;

(c) adhesive-applying means mounted on said frame member and responsive to the upward movement of said elevator means;

(d) support means for a pile of plastic liners, said support means being located remotely from said elevator;

(e) reciprocating carton transfer means arranged to act on the top carton in the stack, said transfer means being movable between said elevator means and the area of said liner support means;

(f) lifting means arranged to pick up the top liner on said support means in timed relation to the transfer of the top carton, the top liner being held in an elevated position whereby the top carton is placed therebelow with the glued surface in contact with the underside of the top liner; and (g) ejection means to remove the assembled liner and carton.

2. The apparatus in accordance with claim 1, including means to fold the assembled cartons and liners after removal by said ejection means.

3. The apparatus in accordance with claim 1 wherein said carton elevator means comprises a pair of support members, a substantially horizontal platform carried by said support members, a reversible drive motor and gear means operatively connecting said drive motor and said horizontal platform.

4. The apparatus in accordance with claim 1 wherein said elevator means includes spacer means arranged to raise one end of the cartons resting thereon.

5. The apparatus in accordance with claim 1 wherein said adhesive-applying means comprises a reservoir adapted to hold a supply of liquid adhesive, a plurality of supply conduits in communication with and extending from said reservoir, a dispensing fitting at the end of each of said supply conduits and means to force the adhesive from said reservoir and out of said dispensive fittings.

6. The apparatus in accordance with claim 5 wherein said reservoir comprises a hollow housing, a sliding member contained in said housing and an air cylinder having a movable piston secured to said sliding member.

7. The apparatus in accordance with claim 5 wherein said reservoir is a pressure tank.

8. The apparatus in accordance with claim 5 wherein said dispensing fitting is an electrically operated solenoid.

9. The apparatus in accordance with claim 6 including an air manifold disposed intermediate and in communication with said dispensing fittings and said air cylinder.

10. The apparatus in accordance with claim 1 wherein said liner support means is a substantially horizontal platform and wherein there is further included static eliminating means on said platform, said static eliminating means being positioned proximate the forward edge of said stack of liners.

11. The apparatus in accordance with claim 1 wherein said liner support means is inclined with respect to a horizontal plane.

12. The apparatus in accordance with claim 1 including transverse spacer means disposed on said liner support means beneath the stack of liners.

13. The apparatus in accordance with claim 1 wherein carton pickup and transfer means comprises a plurality of suction cups, means to apply suction to said cups and means to move said suction cups in back and forth strokes between said carton elevator and said liner support means.

14. The apparatus in accordance with claim 13 wherein said means to move said suction cups comprises a drive motor operable in timed relation to the movement of said carton elevator, a pair of arcuately movable rocker arms driven by said motor, a carriage member secured to each of said rocker arms for movement therewith, said suction cups being secured to said carriage members and means to guide each of said carriage members whereby said suction cups engage the topmost carton on said elevator means at one end of the stroke of said rocker arms.

15. The apparatus in accordance with claim 14 wherein each of said carriage member is pivotally secured to one of said rocker means and wherein said means to guide said carriages is a pair of substantially horizontal spaced parallel rails, said carriage members having rollers in contact with said rails, a cam surface integral with the end of said rails, a cam follower integral with each of said carriage members and in engagement with said rails and biasing means extending between each said carriage member and each said guide means.

16. The apparatus in accordance with claim 1 wherein said means to transfer the top carton on said elevator means is comprised of a drive motor operable in timed relation to the upward movement of said carton elevator means, a pair of arcuately movable rocker arms driven by said drive motor in back and forth strokes, a carriage member secured to each of said rocker arms for movement therewith, a pivotal pusher arm secured to each said carriage member, said pusher arms being arranged to slide over the top carton in said carton elevator on the forward stroke of said rocker arms and engage the rearward end of the top carton whereby the carton is pushed in the direction of the liner support means on the rearward stroke of said rocker arms.

17. The apparatus in accordance with claim 16, including a pair of substantially horizontal spaced parallel rails, said carriage members having rollers in contact with said rails.

18. The apparatus in accordance with claim 1 wherein said liner lifting means comprises a carriage member, means to move said carriage member in two opposite vertical directions and a plurality of suction cups extending downwardly from said carriage member.

19. The apparatus in accordance with claim 18, including means to move said carriage member towards and away from said elevator.

20. The apparatus in accordance with claim 18 wherein said means to move said carriage member vertically is in an air cylinder having a piston connected to said carriage member.

21. The apparatus in accordance with claim 19 wherein said means to move said carriage member is a rack gear integral with said carriage member, a pinion in meshing engagement with said rack gear and means to rotate said pinion.

22. The apparatus in accordance with claim 21 wherein said means to move said carriage member further includes a first platform supporting said air cylinder, a second platform spaced below said first platform and vertically movable with respect to said air cylinder, a rack gear mounted on said second platform and a pinion rotatably mounted on said first platform and in meshing engagement with said rack gear, said suction cups being mounted on said second platform.

23. The apparatus in accordance with claim 22 wherein the position of said suction cups is laterally adjustable with respect to said second platform.

24. The apparatus in accordance with claim 1 wherein said carton and liner ejection means is comprised of a pusher bar carried by said carton transfer means, said pusher bar being arranged to engage the rearward end of an assembled liner and carton as said transfer means moves a carton from said elevator means.

25. The apparatus in accordance with claim 24 wherein said pusher bar is pivotally mounted on said carton transfer means and wherein there is also included means to maintain said pusher bar substantially vertical when an assembled carton and liner is being ejected.

26. A method for securing a thin flexible liner to a cardboard carton, said method comprising the steps of:

(a) arranging a plurality of unfolded cartons in a stack on a horizontal elevator that is movable in a vertical plane;

(b) arranging a plurality of liners in a vertical stack on a substantially horizontal platform that is remote from the elevator;

(c) moving the elevator upwardly in a series of steps each of which is substantially equal to the thickness of a single carton;

(d) applying adhesive to selected portions of the top carton after each upward movement of the elevator when the top carton reaches a predetermined position;

(e) lifting the topmost liner from the remainder of the liner stack;

(f) transferring the top carton from the carton stack to a point directly beneath the bottom surface of the topmost liner; and (g) securing the top liner to the carton directly therebelow.

27. The method in accordance with claim 26 wherein the step of applying adhesive comprises the step of forcing glue out of a dispensing nozzle under pressure.

28. The method in accordance with claim 26 wherein the step of lifting the liner comprises the steps of applying suction to the top liner in the stack and raising the suction applying means.

29. The method in accordance with claim 26 wherein the step of transferring the carton comprises the steps of applying suction to the glued carton and moving the suction applying means from the carton stack to the liner stack.

30. The method in accordance with claim 26 wherein the step of transferring the carton comprises the step of pushing the top carton from the carton stack to the liner stack.

31. The method in accordance with claim 26 wherein the step of arranging the liners in a vertical stack includes the step of tucking under the rearward end of the liners.

32. The method in accordance with claim 26 wherein the step of arranging the cartons in a vertical stack includes the step of elevating the rearward end of the cartons.

33. The method in accordance with claim 26 wherein there is further included the step of folding the carton subsequent to the steps of securing the liner and ejecting the assembly.

34. In apparatus adapted to adhesively secure a plastic liner to an unfolded carton, the apparatus having means to contain a supply of cartons, means to contain a supply of liners remote from the carton supply means, means to apply adhesive to the carton and means to individually move the top carton from the carton supply means to the liner supply means, the combination therewith of lifting means arranged to pick up the top liner on said support means in timed relation to the transfer of the top carton, the top liner being held in an elevated position whereby the top carton is placed therebelow with the glued surface in contact with the underside of the top liner.

35. The apparatus in accordance with claim 34 wherein said liner lifting means comprises a carriage member, means to move said carriage member in two opposite vertical directions and a plurality of suction cups extending downwardly from said carriage member.

36. The apparatus in accordance with claim 35, including means to move said carriage member towards and away from said elevator.

37. The apparatus in accordance with claim 35 wherein said means to move said carriage member vertically is an air cylinder having a piston connected to said carriage member.

38. The apparatus in accordance with claim 36 wherein said means to move said carriage member is a rack gear integral with said carriage member, a pinion in meshing engagement with said rack gear and means to rotate said pinion.

39. The apparatus in accordance with claim 38 wherein said means to move said carriage member further includes a first platform supporting said air cylinder, a second platform spaced below said first platform and vertically movable with respect to said air cylinder, a rack gear mounted on said second platform and a pinion rotatably mounted on said first platform and in meshing engagement with said rack gear, said suction cups being mounted on said second platform.

40. The apparatus in accordance with claim 39 wherein the position of said suction cups is laterally adjustable with respect to said second platform.

References Cited

UNITED STATES PATENTS

| | | | |
|---|---|---|---|
| 2,166,126 | 7/1939 | Carruth | 93—36.6 |
| 3,353,459 | 11/1967 | Owsley | 93—36.6 |

BERNARD STICKNEY, *Primary Examiner.*